July 5, 1932.  F. L. SCHOEL  1,866,061
DOUGHNUT FORMING MACHINE
Filed Dec. 18, 1929   3 Sheets-Sheet 1

Witness
L. H. Hammond.

Inventor
Fred L. Schoel
by Bair, Freeman & Sinclair
Attorneys

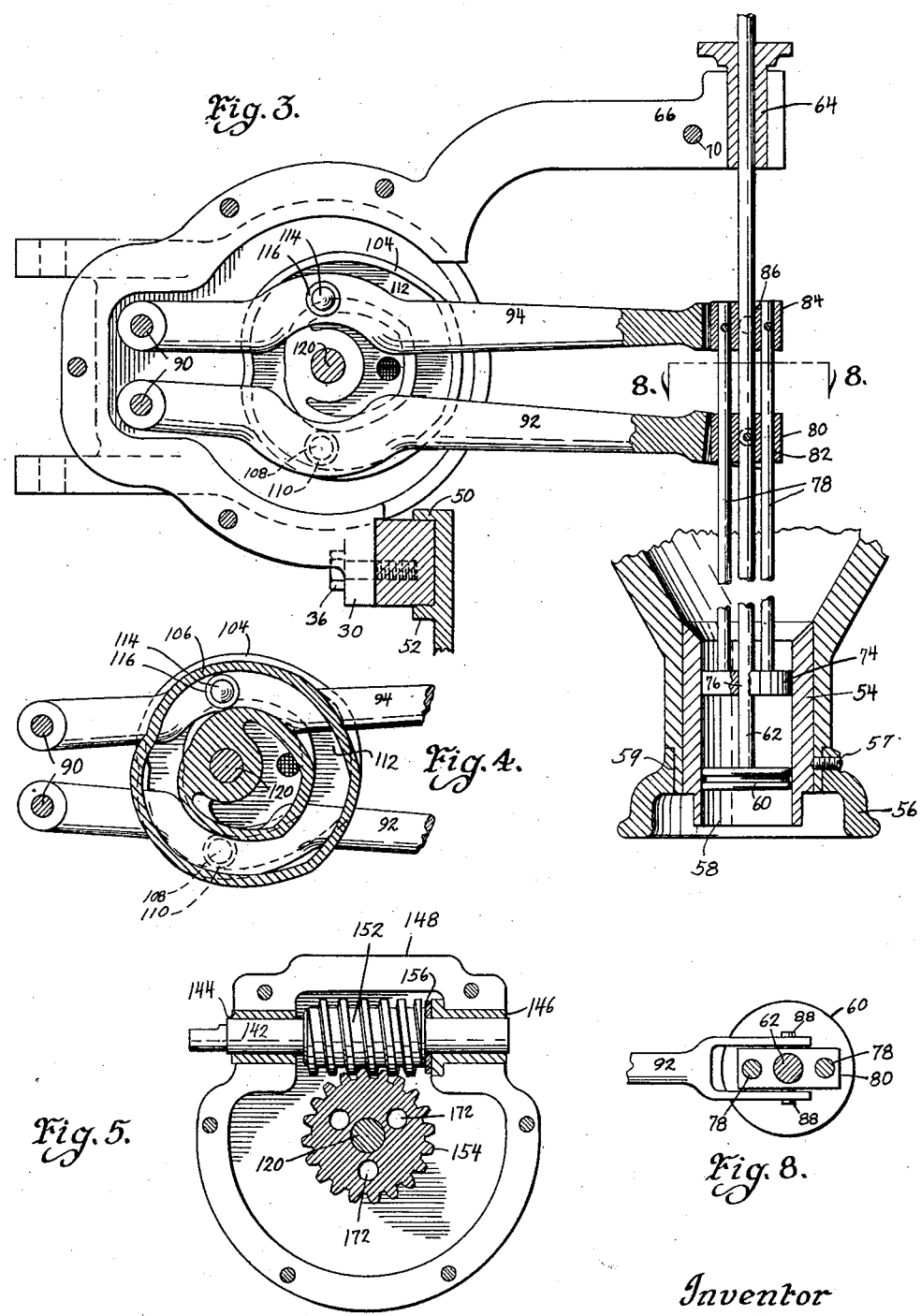

July 5, 1932.  F. L. SCHOEL  1,866,061
DOUGHNUT FORMING MACHINE
Filed Dec. 18, 1929   3 Sheets-Sheet 3
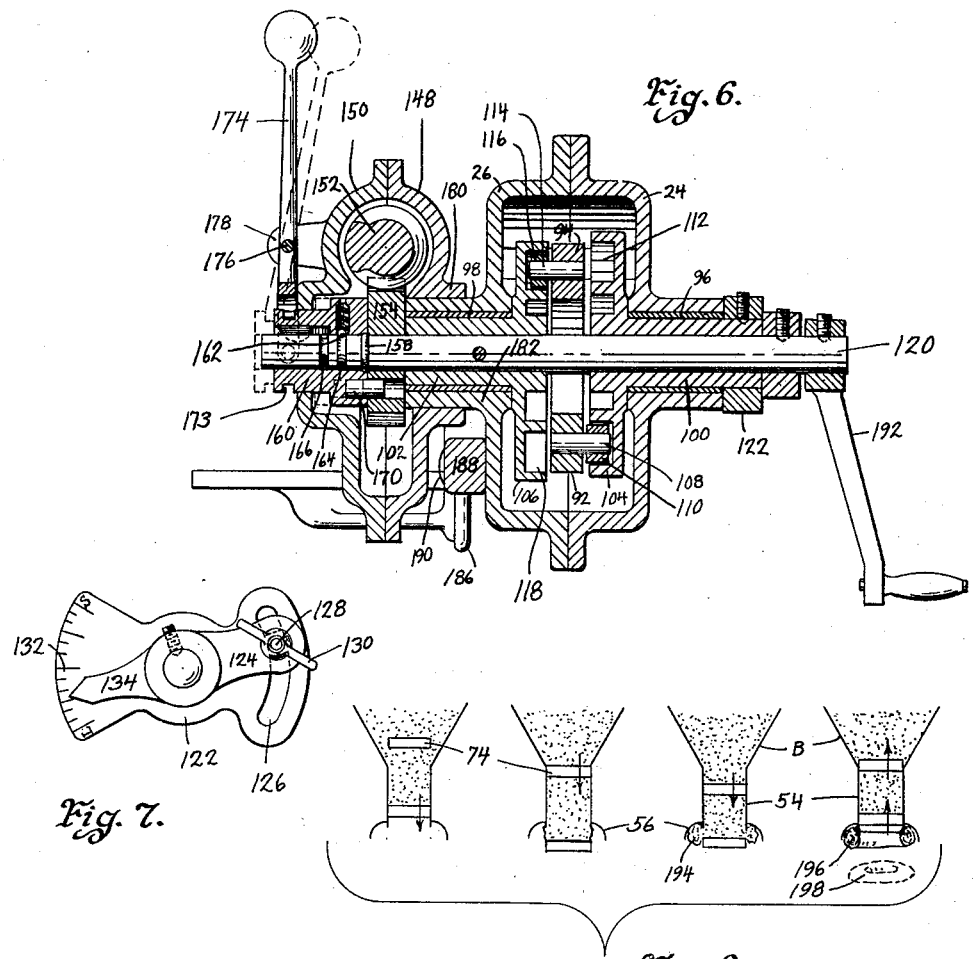
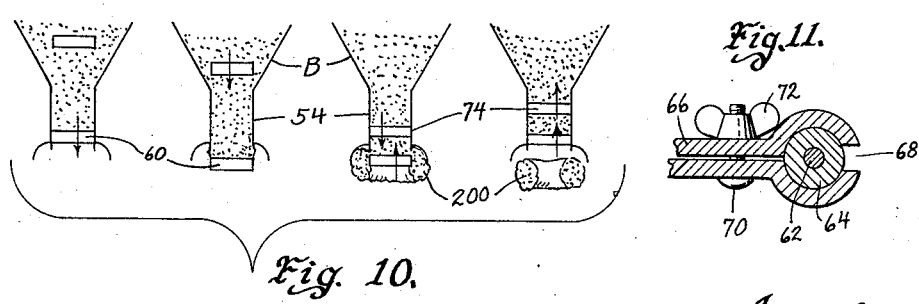
Witness
L. F. Hammond.
Inventor
Fred L. Schoel
by Bair, Freeman & Sinclair
Attorneys Patented July 5, 1932

1,866,061

UNITED STATES PATENT OFFICE

FRED L. SCHOEL, OF WATERLOO, IOWA, ASSIGNOR TO GEM DOUGHNUT MACHINE COMPANY, INC., OF WATERLOO, IOWA

DOUGHNUT FORMING MACHINE

Application filed December 18, 1929. Serial No. 414,942.

The object of my invention is to provide a doughnut forming machine of simple, durable and comparatively inexpensive construction.

A further object is to provide a doughnut forming machine consisting of a hopper supported by a cam housing, the housing being supported on an adjustable bracket secured to a wall or other support, whereby the hopper may be moved to any desired position for discharging formed doughnuts therefrom.

Another object is to provide a doughnut forming mechanism consisting of a neck on the hopper through which a pair of plungers are movably mounted for confining between them a charge of dough and discharging it in the form of a ring from the lower end of the neck.

A further object is to provide a cam and lever mechanism for actuating the plungers.

Still another object is to provide a pair of cams, one for each plunger, the cams being variable with respect to each other for varying the charge of dough and consequently the size of the doughnut formed by the machine.

A further object is to provide means for rotating the cams, consisting of a motor driven worm and a worm gear with a novel clutch arrangement to prevent operation of the cams even though the motor continues to run.

Still a further object is to provide novel details of construction whereby the cams, levers, plungers, etc., are supported for their respective movements and the entire device supported, relative to a wall or other surface.

Still another object is to arrange the hopper and associated parts to facilitate removal thereof for cleaning purposes.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 3 is an enlarged sectional view on the line 3—3 of Figure 2, illustrating the cam, lever and plunger mechanism.

Figure 4 is an enlarged sectional view on the line 4—4 of Figure 2, further illustrating the cam mechanism.

Figure 5 is an enlarged sectional view on the line 5—5 of Figure 2, illustrating the operative connection between the motor and cam shaft.

Figure 6 is an enlarged sectional view on the line 6—6 of Figure 2, illustrating the clutch and cam mechanism and their positions with respect to each other.

Figure 7 is an end view of th gage levers for the cams as viewed from the opposite side of the machine, with respect to the side illustrated in Figure 1.

Figure 8 is a sectional view on the line 8—8 of Figure 3, illustrating the plunger rods and their relative positions.

Figure 9 is a diagrammatic view, showing the plungers in different positions for forming a small doughnut.

Figure 10 is a smaller view, showing the machine adjusted for forming large doughnuts and Figure 11 is a detailed sectional view on the line 11—11 of Figure 1.

Figure 1:
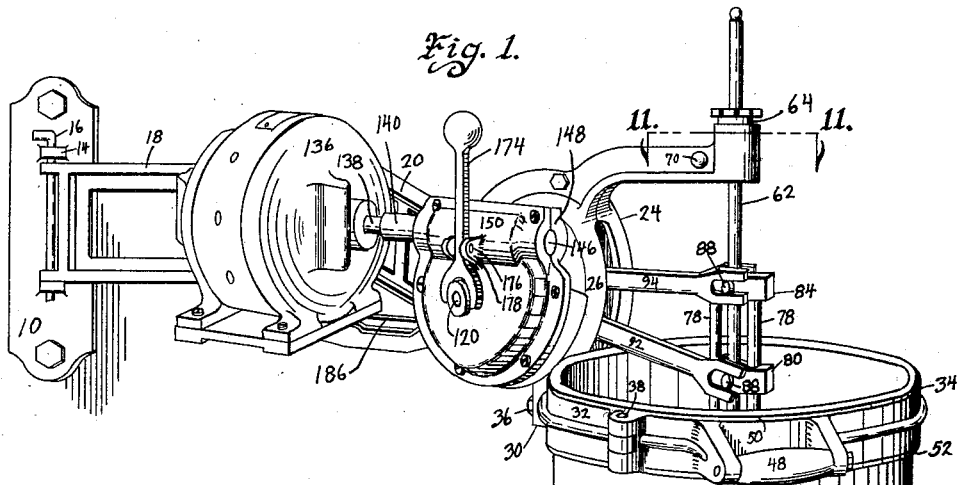
Figure 1 is a perspective view of my doughnut forming machine.

On the accompanying drawings I have used the reference numeral 10 to indicate a supporting plate, adapted to be secured to a wall 12 or other supported surface. A pair of ears 14 are formed on the plate 10 through which a pin 16 extends. A bracket arm 18 is pivoted on the pin 16 and a second bracket arm 20 is pivoted by means of a pin 22 to the arm 18.

Figure 2:
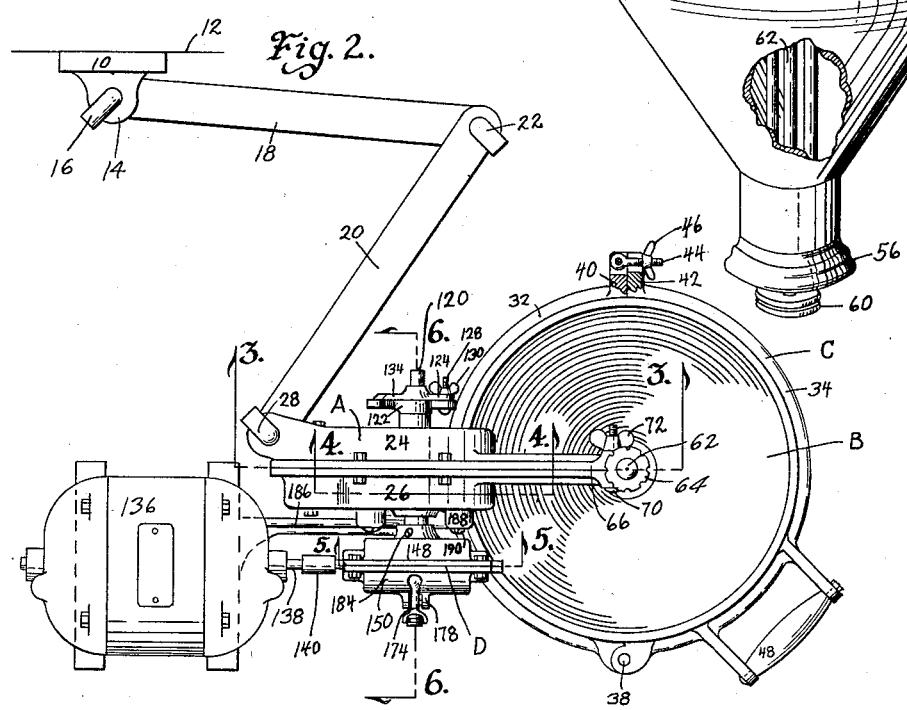
Figure 2 is a plan view of the same.

A cam housing A, consisting of a housing member 24 and a housing member 26 is pivotally mounted on a pin 28, carried by the bracket arm 20. A dough hopper B is carried by the cam housing A in the following described manner: A lug 30 extends downwardly from each portion 24 and 26 of the cam housing A. A supporting ring, comprising portions 32 and 34 is secured to the lugs 30 by cap screws 36. The portions 32 and 34 and the ring C are hinged together at 38. Forked ears 40 and 42 are formed on the portions 32 and 34 of the ring C, opposite the hinge 38. A bolt 44 is pivoted to the ear 40, extends through the ear 42 and is provided with a wing nut 46 as best shown in Figure 2 of the drawings. A handle 48 is formed on the ring C.

The hopper B is provided with flanges 50 and 52, above and below the ring C. From the construction of the ring, as just described, it will be obvious that the ring can be opened for removal of the hopper B for cleaning purposes.

The hopper B is provided with a neck 54, terminating in a bell mouth 56. The neck 54, which is of tubular construction, is provided with a skirt 58, extending into the bell mouth 56. A plunger 60 is slidably mounted through the neck 54. The plunger 60 is fixed to the lower end of a rod 62 which extends upwardly through a bearing 64. The bearing 64 is supported by an arm 66 of split construction, extending from the cam housing A.

As best shown in Figure 11, the arm 66 is provided with a slot opening 68, wider than the diameter of rod 62. The bearing 64 is adapted to be clamped between the halves of the arm 66 by a clamping bolt 70 and wing nut 72. When the ring C is opened to allow removal of the hopper B, the wing nut 72 may be loosened sufficient to allow removal of the bearing 64 by pulling it upwardly, after which the rod 62 may be drawn through the slot 68.

A second plunger 74 is slidably mounted through the neck 54. The plunger 74 is provided with an opening 76 through which the rod 62 is slidably mounted. A pair of rods 78 are secured to the plunger 74 and extend upwardly parallel with the rod 62 and positioned on opposite sides thereof. A block 80 is secured to the rod 62 and provided with openings 82 through which the rods 78 are slidable. A second block 84 is secured to the rods 78 and is provided with an opening 86 through which the rod 62 is slidable. The blocks 80 and 84 are provided with pintles 88.

Oscillatably mounted on pivot pins 90, carried by the cam housing A is a pair of levers 92 and 94. The outer ends of the levers 92 and 94 are forked to coact with the pintles 88 on the blocks 80 and 84. Thus it will be seen that oscillating movement, imparted to the arms 92 and 94 will cause reciprocating movement of the rods 62 and 68 and the plungers 60 and 74. It will also be seen that removal of the hopper B from the ring C will disengage the pintles 88 from the forked ends of the levers 92 and 94.

The portions 24 and 26 of the cam housing A are provided with bearings 96 and 98 respectively. Sleeves 100 and 102 are journaled in the bearings 96 and 98 respectively. A cam 104 is formed on the sleeve 100 and a cam 106 is formed on the sleeve 102. The lever 92 has a projecting stud 108 on which is journaled a roller 110 for coaction with the cam groove 112 of the cam 104. The lever 94 is provided with a projecting stud 114 on which is journaled a roller 116 for coaction with the cam groove 118 in the cam 106. Thus it will be seen that rotation of the cams 104 and 106 will cause movement of the plungers 60 and 74 through the neck 54.

The sleeve 100 of the cam 104 is loosely mounted on a shaft 120. The sleeve 102 of the cam 106 is secured to the shaft 120. A gauge lever 122 is secured to the sleeve 100 and gauge lever 124 is secured to the shaft 120. The gauge lever 122 is provided with a curved slot 126 in which the square portion beneath the head of a carriage bolt 128 is slidably mounted. The bolt 128 extends through an opening in the gauge lever 124 and a wing nut 130 is screwed thereon.

The gauge lever 122 is provided with a graduated scale 132 and the gauge lever 124 is provided with a pointer 134.

For imparting rotation to the shaft 120, I provide a motor 136 or other suitable power means. The shaft 138 of the motor 136 is connected by the coupling 140 with a worm shaft 142. The worm shaft 142 is journaled in bearings 144 and 146, supported between the two halves, 148 and 150 of a worm gear casing D.

A worm 152 is mounted on the worm shaft 142 and coacts with a worm gear 154, loosely mounted on the shaft 120 and adapted to rotate whenever the motor 136 is energized. A thrust washer 156 is provided for the worm 152. The worm gear 154 is retained on the shaft 120 by means of a retainer ring 158.

I provide a clutch means for operatively connecting the worm gear 154 with the shaft 120 consisting of a clutch member 160 slidably mounted on the shaft 120. The clutch member 160 is provided with a spring pressed ball 162 adapted to selectively coact with annular depressions 164 and 166 formed in the shaft 120. The clutch member 160 is provided with a stud 170 adapted to enter any one of a plurality of openings 172 formed in the worm gear 154 when the clutch is "on" position.

The clutch member 160 is provided with an annular groove 173 into which a pair of prongs of a clutch lever 174 extend. The clutch lever 174 is pivoted on a pin 176 carried by ears 178 formed on the cover portion 150 of the worm gear housing D.

The worm gear housing D is provided with a hub 180 adapted to be affixed to a hub 182 of the cam housing A by means of a set screw 184 whereby the worm gear housing is supported relative to the cam housing. A motor support bracket 186 is provided with a yoke shaped end 188 adapted to be secured to the cam housing A by means of screws or the like 190. A crank 192 may be secured to the shaft 120 for hand operation of the doughnut forming machine when the clutch member 160 is in "off" position.

Practical operation

In the operation of my device the hopper B is filled with doughnut dough of the proper consistency after the plungers 60 and 74 and the neck 54 etc. have been greased to prevent sticking of the dough to the machine. The motor 136 is then energized (with the clutch in "off" position as shown by dotted lines in Figure 6) until it attains its normal operating speed. The clutch may then be moved to "on" position as shown by full lines in Figure 6 and the cams 104 and 106 will be simultaneously rotated. Up and down movement will then be imparted to the plungers 60 and 74, the plunger 74, coming up into the tapered portion of the hopper B once each reciprocation and the plunger 60 extending below the skirt 58 once each reciprocation as shown in Figures 9 and 10 of the drawings.

When adjusted for small doughnuts, the plungers 60 and 74 will move downwardly in a certain spaced relation as shown in Figure 9 and will discharge dough into the bell mouth 56 around the skirt 58 as shown at 194 in Figure 9. It will be noted that the cam grooves 112 and 118 provide for a steady up and down movement of the plungers 60 and 74 from one position to the other with the plunger 60 remaining stationary a predetermined length of time below the skirt 58 and the plunger 74 remaining stationary above the neck 54 a predetermined length of time. The resulting action is for the plunger 60 to remain stationary while the plunger 74 continues to move downwardly for squeezing the dough out into the bell mouth 56 as at 194 in Figure 9. The plungers then both move upwardly for cutting the formed doughnut off as shown at 196 in Figure 9 and dropping it as indicated at 198 into a suitable receptacle of hot oil. It will be noted that the plungers in their upward movement are slightly closer together than when coming down and the dough that has been discharged is represented by the difference in the volume between the plungers in the first two views of Figure 9 and the last two views thereof.

When the machine is adjusted for large doughnuts, by moving the pointer 134 from S in Figure 7 to L, the action will occur as depicted in Figure 10. It will be noted that in the downward movement of the plungers, they are considerably spaced from each other as shown in the first two views of Figure 10 and relatively closer together as shown in the last two views. The difference in volume between the plungers represents the dough that has been discharged to form the large doughnut, indicated at 200. Thus by adjusting one cam relative to the other and thereafter locking them in such position for simultaneous rotation, the machine may be easily and quickly adjusted for doughnuts of any desired size between maximum and minimum.

For observing the use of the machine when adjusting it or for any other purpose, the machine may be actuated by manually turning the crank 192. The hopper and plungers are easily cleaned by opening the ring C, removing the bearing 64 after the wing nut 72 is loosened and pulling the hopper, plungers and rods away from the cam housing A after which these parts may be disassembled and washed and may then be easily and quickly replaced.

In the foregoing specification I have referred to adjusting the machine for large and small doughnuts. Actually the inside diameter of these doughnuts are substantially the same but their weight varies to some degree. It will be noted that the bell mouth 56 is held in position by a set screw 57, extending through a reduced portion 59 at the lower end of the hopper B and into the neck sleeve 54. This set screw may be slightly loosened and the sleeve 54 removed and replaced with a different one of larger internal diameter for increasing the internal diametric size of the doughnut. The plungers 60 and 74, of course, are also changed to larger ones to fit the new sleeve 54.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a machine of the class described, a frame, a hopper detachable therefrom, a neck on the hopper, a plunger for travel therein, a plunger rod supporting said plunger, a guide bearing for said rod, a supporting arm for said guide bearing, said arm being split to receive the bearing, such split being wide enough for the plunger rod to pass therethru.

2. In a machine of the class described, a frame, a hopper detachably connected therewith, a neck on said hopper, a plunger for travel through said neck, a plunger rod supporting said plunger, a guide bearing for said rod, a supporting arm for said guide bearing, said guide bearing being removable therefrom, and a slot in said arm to allow passage of said plunger rod therethrough when said guide bearing is removed.

Des Moines, Iowa, October 25, 1929.

FRED L. SCHOEL.